(12) United States Patent
Schon et al.

(10) Patent No.: US 7,136,487 B1
(45) Date of Patent: Nov. 14, 2006

(54) SYSTEM AND METHOD FOR AUTOMATICALLY PROTECTING PRIVATE VIDEO CONTENT USING EMBEDDED CRYPTOGRAPHIC SECURITY

(75) Inventors: Walter J. Schon, Tigard, OR (US); William L. Jones, Portland, OR (US)

(73) Assignee: McAfee, Inc., Santa Clara, CA (US)

( * ) Notice: Subject to any disclaimer, the term of this patent is extended or adjusted under 35 U.S.C. 154(b) by 714 days.

(21) Appl. No.: 09/931,803

(22) Filed: Aug. 16, 2001

Related U.S. Application Data

(63) Continuation of application No. 09/344,389, filed on Jun. 25, 1999, now Pat. No. 6,484,176.

(51) Int. Cl.
```
H04N 7/167    (2006.01)
H04K 1/00     (2006.01)
H04L 9/00     (2006.01)
H04L 9/28     (2006.01)
H04L 9/30     (2006.01)
H04L 9/32     (2006.01)
G06F 11/30    (2006.01)
G06F 12/14    (2006.01)
```
(52) U.S. Cl. .............. 380/229; 713/176; 713/184; 713/193; 713/194; 380/201; 380/28; 380/29; 380/30; 380/210; 380/228; 380/203

(58) Field of Classification Search ............ 380/28–30, 380/201; 713/176, 193, 183, 184
See application file for complete search history.

(56) References Cited

U.S. PATENT DOCUMENTS 5,499,294 A    3/1996  Friedman .............. 380/10

5,621,579 A    4/1997  Yuen .................... 386/121

(Continued)

FOREIGN PATENT DOCUMENTS

EP    1 096 714    5/2001

(Continued)

OTHER PUBLICATIONS

Orfali et al., "Client/Server Survival Guide," 3rd Ed. (1999). Ch. 7, Wiley & Sons, USA.

(Continued)

Primary Examiner—Ayaz Sheikh
Assistant Examiner—Longbit Chai
(74) Attorney, Agent, or Firm—Zilka-Kotab, PC; Christopher J. Hamaty

(57) ABSTRACT

A system and method for automatically protecting private video content using embedded cryptographic security is disclosed. A substantially continuous video signal representing raw video content is divided into individual frames. Each frame stores a fixed amount of data in digital form. Each individual frame is encrypted into encrypted video content using an encryption cryptographic key. The encrypted frames is stored on a transportable storage medium. Encrypted frames are retrieved from the transportable storage medium. A decryption cryptographic key is verified prior to decryption. Each encrypted frame is decrypted using the decryption cryptographic key. The decrypted frames are combined into a substantially continuous video signal representing the raw video content in reconstructed form. In a further embodiment, private video content automatically authenticated using embedded cryptographic security, either alone or in conjunction with the encryption of video content.

42 Claims, 15 Drawing Sheets

U.S. PATENT DOCUMENTS

| | | | |
|---|---|---|---|
| 5,623,637 A | 4/1997 | Jones et al. ................. | 395/491 |
| 5,799,083 A * | 8/1998 | Brothers et al. ............ | 380/239 |
| 5,912,972 A * | 6/1999 | Barton ........................ | 713/176 |
| 5,974,141 A | 10/1999 | Saito ............................ | 380/4 |
| 6,178,242 B1 * | 1/2001 | Tsuria ......................... | 380/201 |
| 6,587,949 B1 | 7/2003 | Steinberg .................... | 713/193 |
| 6,694,023 B1 | 2/2004 | Kim ............................ | 380/203 |
| 6,731,756 B1 | 5/2004 | Pizano et al. ............... | 380/201 |
| 2001/0009580 A1 | 7/2001 | Ikeda ......................... | 380/201 |
| 2002/0112168 A1 * | 8/2002 | Filipi-Martin et al. ...... | 713/183 |
| 2003/0120604 A1 | 6/2003 | Yokota et al. ................ | 705/57 |

OTHER PUBLICATIONS

Office Action Summary from U.S. Appl. No. 09/931,794, which was mailed on Jun. 1, 2005.

Office Action Summary from U.S. Appl. No. 09/931,794, which was mailed on Mar. 7, 2005.

* cited by examiner

160

170

SYSTEM AND METHOD FOR AUTOMATICALLY PROTECTING PRIVATE VIDEO CONTENT USING EMBEDDED CRYPTOGRAPHIC SECURITY

This patent application is a continuation of U.S. patent application Ser. No. 09/344,389 filed Jun. 25, 1999, now U.S. Pat. No. 6,484,176, issued Nov. 19, 2002 the priority date of which is claimed and the disclosure of which is incorporated by reference.

FIELD OF THE INVENTION

Background of the Invention

Digital video cameras have become increasingly popular and are commonly used by professionals and consumers alike to produce videotaped movies or, simply "videos." Digital video cameras differ from conventional movie cameras by storing information on cartridges of electronic tape, rather than on photographic film reels. Images are converted and stored as a continuous electronic signal streamed onto videotapes for storage, editing and viewing.

The number and types of users of video camera technology has continued to grow for several reasons. Recording videos in digital form originally required significant amounts of storage capacity. However, recent advances in providing increased storage capacity at lower cost have made digital video camera technology available to a wider user base. Further, videos are more flexible than film and can be exchanged electronically, including over digital data transmission means, such as the Internet. Finally, de facto standardized video formats allow device-independent playback, even using commonly available Web-browsers.

The availability of standardized data formats and the ease of dissemination can facilitate the creation and distribution of illicit copies. Conventional digital video cameras, including recorders and players, lack fundamental security measures to protect against the unauthorized use and compromise of private video content and to provide trustworthy authentication of authorship. Several recent examples of video compromise and theft underscore the need for effective security for private video content. In one notorious case, a private video taken of a celebrity couple was stolen and posted on the Internet, resulting in embarrassment and harm to their reputations. In other instances, stolen video content has been reproduced and sold without authorization, thereby resulting in lost profits.

Similarly, digital video content can be easily fabricated or altered. Conventional digital video cameras, including recorders and players, likewise lack means for authenticating the identity of the author. Authentication is particularly important in such fields as law enforcement where the veracity of data and identity of authorship play critical roles.

In the prior art, copy guard protections have long been used to protect commercially produced videos. However, only rudimentary security measures using basic password protection exist for protecting private video content. Typically, a password is applied to the recorded digital data file and playback is disabled, absent the correct entry of the password. This form of password protection, though, protects the media as a whole and not the individual parts or frames. Moreover, the password is generally applied after recording is complete and not as part of the recording or playback processes. Thus, the video content is at risk of compromise until the password is secured. For these reasons, password security offers only marginal protection and is easily compromised.

Therefore, there is a need for an approach to providing embedded security and authentication to private digital video production to protect content during playback and to authenticate an author. Preferably, such an approach would incorporate flexible security intrinsic to both the recordation and playback processes using a cryptographic security scheme.

There is a further need for an approach to providing embedded security and authentication on digital video production devices. Preferably, such an approach would selectively provide on-the-fly symmetric or asymmetric encryption (or both) of recorded data and would further provide trustworthy authentication as an integral part of the data recordation process.

SUMMARY OF THE INVENTION

The present invention provides a system and method for cryptographically protecting private video content during the recordation and playback processes. Individual frames are extracted during the image recordation process. Each frame is encrypted using an encryption cryptographic key prior to storage on a preferably transportable storage medium, such as a videotape. Upon playback, a decryption cryptographic key is preferably first credentialed, then used to decrypt the encrypted frames retrieved from the videotape. The decrypted frames are reassembled into a reconstructed video signal for playback. The encryption and decryption cryptographic keys are preferably asymmetric public and private keys, respectively, but could also be symmetric cryptographic keys.

The invention also provides private video content automatically authenticated using embedded cryptographic security, either alone or in conjunction with the encryption of video content. For security reasons, only frames that are "signed" can be verified for authorship. Multiple frames could be signed with a single signature to enhance performance, but each frame is preferably signed individually.

An embodiment of the present invention is a system and a method for automatically protecting private video content using embedded cryptographic security. A substantially continuous video signal representing raw video content is divided into individual frames. Each frame stores a fixed amount of data in digital form. Each individual frame is encrypted into encrypted video content using an encryption cryptographic key. The encrypted frames is stored on a transportable storage medium. Encrypted frames are retrieved from the transportable storage medium. A decryption cryptographic key is verified prior to decryption. Each encrypted frame is decrypted using the decryption cryptographic key. The decrypted frames are combined into a substantially continuous video signal representing the raw video content in reconstructed form.

A further embodiment is a system and method for encrypting private video content using embedded cryptographic security. A substantially continuous video signal representing raw video content is received. The data signal is divided into individual frames which each store a fixed amount of data in digital form. Each individual frame is encrypted into encrypted video content using an encryption key selected from a cryptographic key pair. The encrypted frames is stored on a transportable storage medium for retrieval and decryption using a decryption key selected from the cryptographic key pair.

A further embodiment is a system and method for decrypting private video content using embedded cryptographic security. Encrypted frames are retrieved from a transportable storage medium. The encrypted frames store raw video content encrypted using an encryption cryptographic key selected from a cryptographic key pair. Each encrypted frame is decrypted using a decryption cryptographic key selected from the cryptographic key pair. The decrypted frames are combined into a substantially continuous video signal representing the raw video content in reconstructed form.

A further embodiment is a system and method for automatically authenticating private video content using embedded cryptographic security. A substantially continuous video signal representing raw video content is divided into individual frames. Each individual frame stores a fixed amount of data in digital form. A fixed-length original cryptographic hash is generated from at least one such individual frame. The original cryptographic hash is encrypted using an encryption cryptographic key. The encrypted original cryptographic hash is stored as a digital signature on a transportable storage medium. The digital signature is retrieved from the transportable storage medium. The encrypted original cryptographic hash is decrypted using a decryption cryptographic key. A verification fixed-length cryptographic hash is generated from at least one such individual frame. The verification cryptographic hash and the original cryptographic hash are compared.

A further embodiment is a system and method for digitally signing private video content using embedded cryptographic security. A substantially continuous video signal representing raw video content is received. The data signal is divided into individual frames. Each individual frame stores a fixed amount of data in digital form. A fixed-length original cryptographic hash is generated from at least one such individual frame. The original cryptographic hash is encrypted using an encryption cryptographic key selected from a cryptographic key pair. The encrypted original cryptographic hash is stored as a digital signature on a transportable storage medium for retrieval and verification using a decryption key selected from the cryptographic key pair.

A further embodiment is a system and method for verifying digitally signed private video content using embedded cryptographic security. A digital signature is retrieved from a transportable storage medium. The digital signature contains an original cryptographic hash encrypted using an encryption cryptographic key selected from a cryptographic key pair. The encrypted original cryptographic hash is decrypted using a decryption cryptographic key selected from the cryptographic key pair. A verification fixed-length cryptographic hash is generated from at least one individual frame retrieved from the transportable storage medium. The verification cryptographic hash and the original cryptographic hash are compared.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
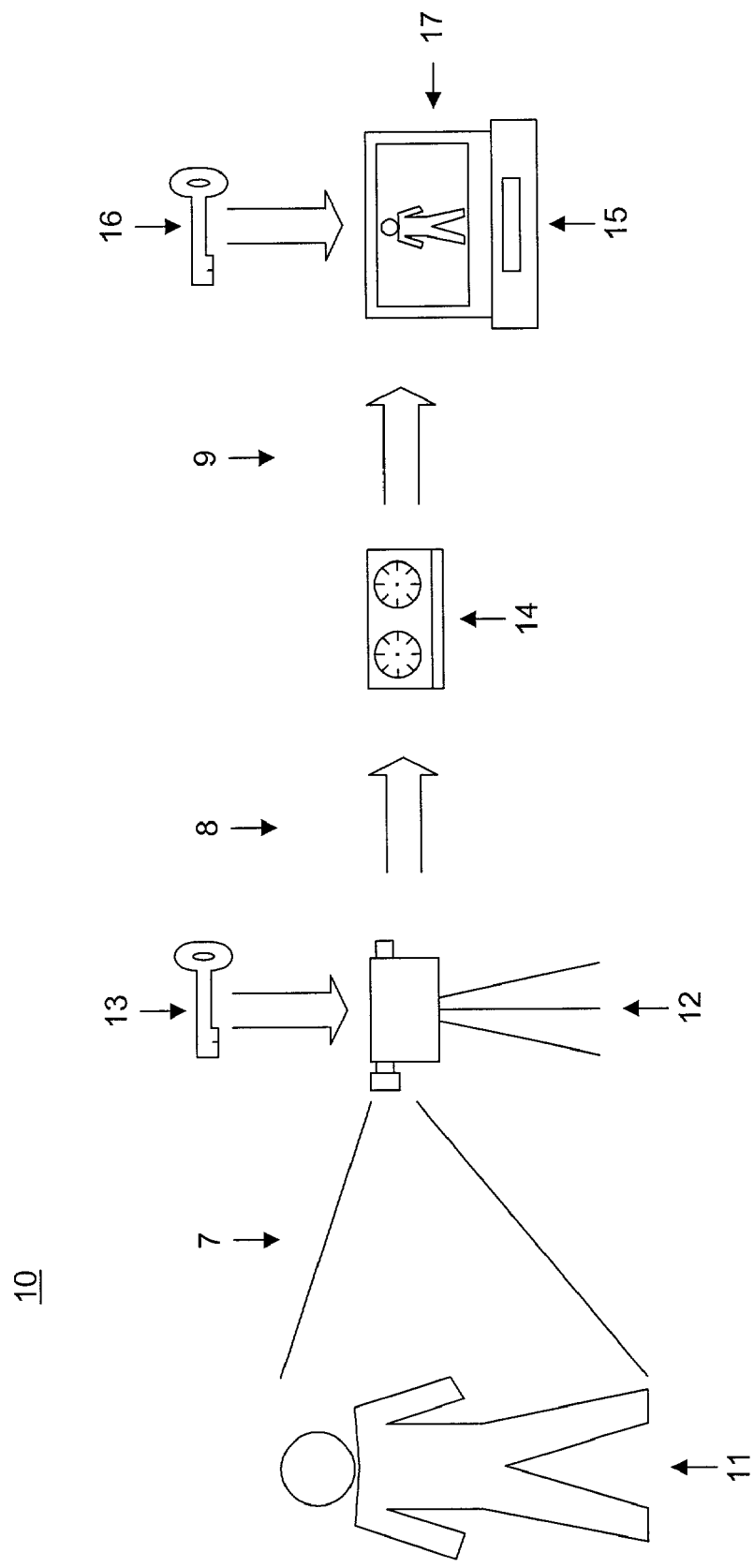
FIG. 1 is a block diagram showing a system for automatically protecting and authenticating video content using embedded cryptographic security, in accordance with the present invention.

FIG. 1 is a block diagram showing a system for automatically protecting and authenticating video content using embedded cryptographic security 10, in accordance with the present invention. Video content 11 is produced using a video camera 12 to record (transition 7) moving images and sound. Generally, the video content 11 is private video content originally recorded as original content and not as mass produced video content intended for commercial distribution. The video camera 12 translates the light and sound from a moving image into a substantially continuous, preferably digitized, signal that is recorded electronically on a transportable storage medium, such as a videotape. The videotape can be viewed using a video player 15 which generates a reconstructed and substantially continuous signal for display on a television, monitor or similar viewing screen 17.

The video camera 12, videotape, and video player 15 are conventional devices as known in the art, but the video camera 12 and video player 15 are augmented with embedded cryptographic security features as described herein. As well, the video camera 12 could be any form of video recording device, including a video cassette recorder (VCR), and the video player 15 could be any form of video playback device, including a video camera or personal computer system. Alternatively, the videotape itself could be crypto-enabled to provide legacy cryptographic security, such as described in the related commonly-assigned U.S. patent application Ser. No. 09/931,794, filed Aug. 16, 2001, pending, the disclosure of which is incorporated by reference.

The video content 11 recorded by the video camera 12 is automatically protected using embedded cryptographic security. An encryption cryptographic key ("encryption key") 13 is used during the recordation process by the video camera 12 to automatically encrypt the video content 11 prior to storage (transition 8) onto the videotape as encrypted video content 14, as further described below in FIG. 3. Similarly, a decryption cryptographic key ("decryption key") 16 is used during the playback process by the video player 15 to automatically decrypt the encrypted video content 14 following retrieval from the videotape (transition 9), as further described below with reference to FIG. 4.

In the described embodiment, an asymmetric, or public key, encryption scheme is preferred, using a public key and private key as the encryption key 13 and decryption key 16, respectively. Three commonly known public key encryption schemes are the RSA, TwoFish and Diffie-Hellman encryption.

Alternatively, a symmetric cryptographic scheme could also be used, using the same cryptographic key for encryption and decryption. Asymmetric and symmetric cryptographic schemes are described in R. Orfali, "Client/Server Survival Guide, $3^{rd}$ Edition," Ch. 7, John Wiley & Sons, Inc. (1999), the disclosure of which is incorporated by reference. An exemplary public key cryptographic system suitable for use in the present invention is the PGP Desktop Security product, licensed by Networks Associates Technology, Inc., Santa Clara, Calif.

The video player 15 preferably further includes means for credentialing a user attempting to decrypt encrypted video content 14 retrieved from the videotape using a decryption key 16. For example, public key cryptographic schemes generally require the entry of a pass-phrase or password to validate the identity of a user attempting to decrypt content encrypted using a corresponding private key. The credentialing means could be by way of a keyboard or similar input device.

In a further embodiment, the video content 11 recorded by the video camera 12 is automatically authenticated using the embedded cryptographic security. The encryption key 13 is used during the recordation process by the video camera 12 to automatically digitally sign the video content 11 prior to storage (transition 8) onto the videotape, as further described below in FIG. 9. Similarly, the decryption key 16 is used during the playback process by the video player 15 to automatically verify the digitally signed video content 11 following retrieval from the videotape (transition 9), as further described below with reference to FIG. 10. To perform automatic authentication, a private key is used as the encryption key 13 and a public key is used as the decryption key 16. Automatic authentication could be performed in combination with automatic protection to ensure that the video content 11 is protected and the proper identity of the author is ensured, as further described below with reference to FIGS. 14 and 15.

Figure 2:
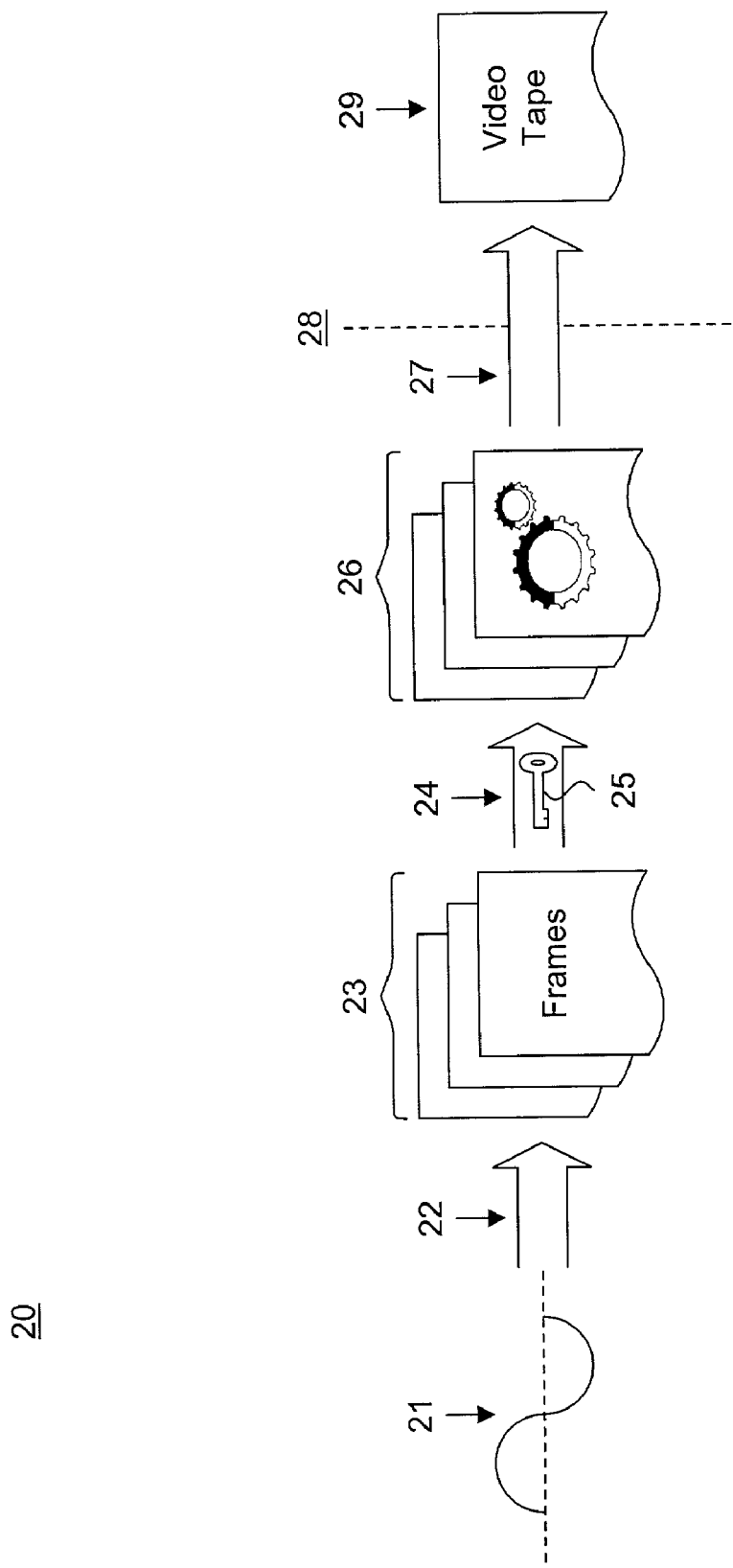
FIG. 2 is a process flow diagram showing the encryption of the video content using the video camera of FIG. 1.

FIG. 2 is a process flow diagram 20 showing the encryption of video content 11 using the video camera 12 of FIG. 1. The video content 11 is represented by a substantially continuous signal 21 that is generated by the video camera 12 as an electronic representation of the images and sounds being recorded. The continuous signal 21 is divided (transition 22) into discrete frames 23 of information having a fixed size. Each frame is encrypted (transition 24) using an encryption key 25, as further described below with reference to FIG. 7, to generate encrypted frames 26. The encrypted frames 26 are then recorded (transition 27) onto a videotape 29. Note only encrypted video content 14 passes the physical boundary 28 separating the video camera 12 from the videotape 29.

Figure 3:
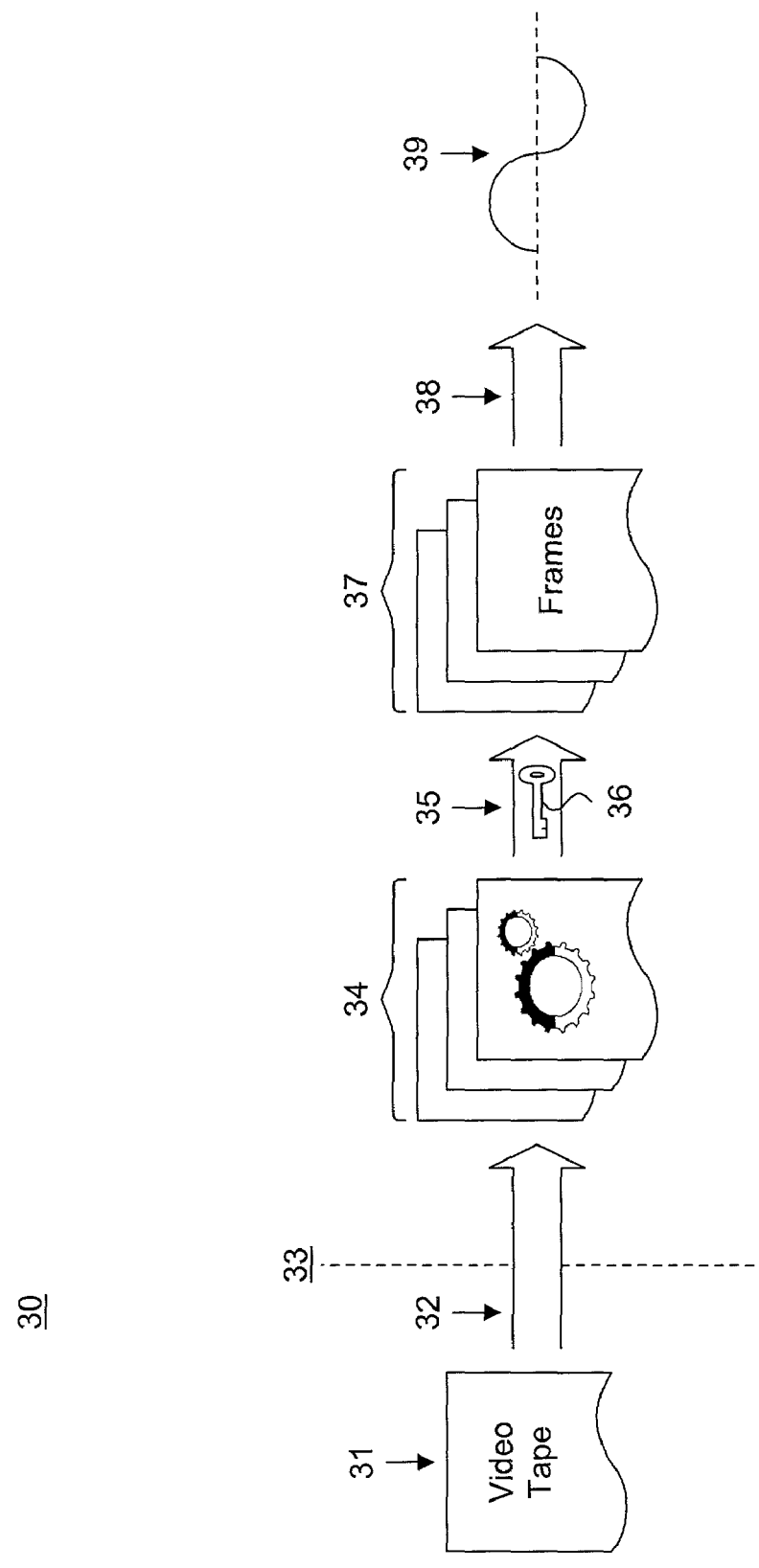
FIG. 3 is a process flow diagram showing the decryption of encrypted video content using the video player of FIG. 1.

FIG. 3 is a process flow diagram 30 showing the decryption of encrypted video content 14 using the video player 15 of FIG. 1. A videotape 31 storing the encrypted video content 14 is read (transition 32) by the video player 15. Note only encrypted video content passes the physical boundary 33 separating the videotape 31 from the video player 15. The encrypted video content 14 is retrieved as a sequence of encrypted frames 34 generated by the video camera 12 during the encryption process 20. Each encrypted frame 34 is decrypted (transition 35) using a decryption key 36, as further described below with reference to FIG. 8. The decryption key is first credentialed using a pass-phrase or password (not shown) prior to decrypting the encrypted frames 34. The decrypted frames 37 are reassembled (transition 38) into a reconstructed continuous signal 39 for viewing, processing or storage.

The video camera 12 and video player 15 include cryptographic operating logic as further described below with reference to FIGS. 4 and 5, respectively, for encrypting and decrypting video content. In the described embodiment, the operating logic is implemented as part of an embedded system. However, the processing logic could also be implemented in programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

In addition, each process flow 20 and 30 can be implemented as a computer program, procedure or module written as source code in a conventional programming language, such as the Java or Visual Basic programming languages, and can be presented for execution to a processor as object or byte code, as is known in the art. The various implementations of the source code and object and byte codes can be held on a computer-readable storage medium or embodied on a transmission medium in a carrier wave.

Figure 4:
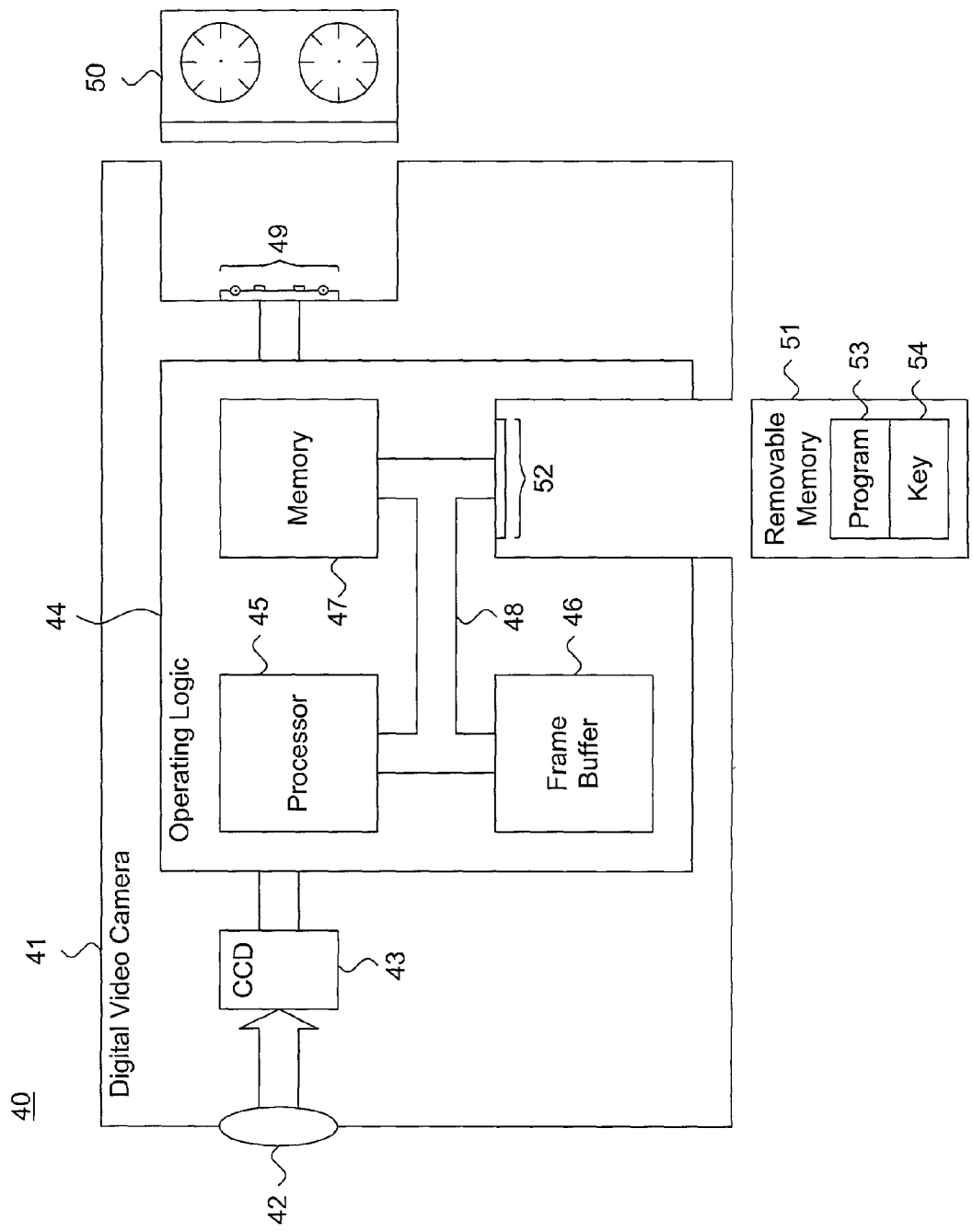
FIG. 4 is a block diagram showing the components of the video camera of FIG. 1.

FIG. 4 is a block diagram showing the components 40 of the video camera 12 of FIG. 1. For clarity of presentation, only the components pertinent with reference to the encryption process 20 (shown in FIG. 2) are described, as the remaining opto- and electro-mechanical functions would be readily known to one skilled in the art. In addition, sound recordation and reproduction components have been omitted, as the processing of sound data is analogous to image data and would be handled in an identical manner.

A raw image is received through a lens 42 and converted into a substantially continuous signal by a charge-coupled device (CCD) 43 or similar image conversion unit. The continuous signal is fed into embedded cryptographic operating logic 44 for conversion from video content 11 to encrypted video content 14 (shown in FIG. 1). The operating logic 44 includes four components interconnected via a bus 48: processor 45, frame buffer 46, memory 47 and removable memory 51. The memory 47 stores both operational program logic and transient data. The processor 45 executes instructions stored in the memory 47 to control the recordation, processing and transformation of the continuous signal 21 into encrypted video content 14 on a videotape 50. The frame buffer 46 converts the continuous signal 21 into individual frames 23.

The removable memory 51 preferably includes a program 53 and an encryption key 54. The program 53 includes instructions for encrypting the frames 23 using the encryption key 54. In the described embodiment, the removable memory 51 operatively couples to a standardized connector 52, thereby enabling multiple encryption keys 54 to be used in conjunction with the video camera 41. The processor 45 executes the program 53 to encrypt the frames 23 into encrypted frames 26 which are then stored on a preferably transportable videotape 50 via a tape recordation transport assembly 49.

In a further embodiment, the program 53 includes instructions for digitally signing the frames 23 using the encryption key 54, as further described below with reference to FIG. 12. The processor 45 executes the program 53 to generate a cryptographic hash of the frames 23. The hash is then encrypted using the encryption key 54 to generate a digital signature which is stored on the preferably transportable videotape 50.

Figure 5:
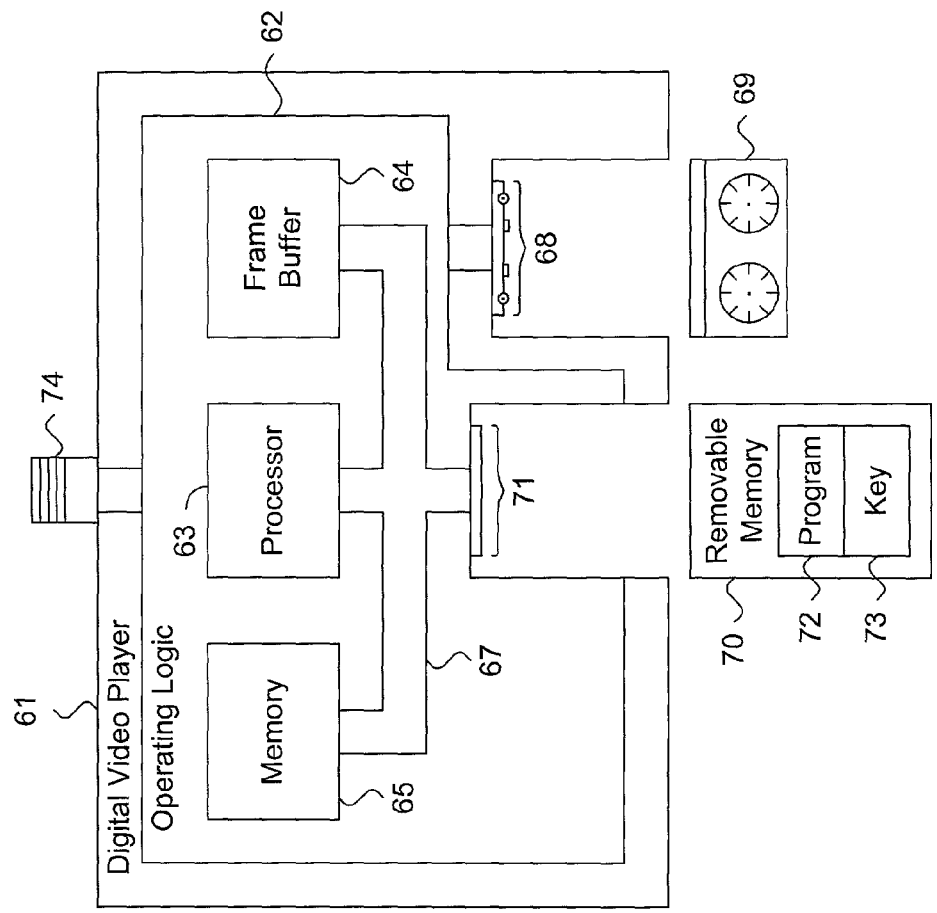
FIG. 5 is a block diagram showing the components of the video player of FIG. 1.

FIG. 5 is a block diagram showing the components 60 of a digital video player 61 using embedded cryptographic security. As with FIG. 4, for clarity of presentation, only components pertinent with reference to the decryption process 30 (shown in FIG. 3) are described, as the remaining opto- and electro-mechanical functions would readily be known to one skilled in the art. In addition, sound recordation and reproduction components have been omitted, as the processing of sound data is analogous to image data and would be handled in an identical manner.

Encrypted video content 14 is retrieved from a videotape 69 and converted into a reconstructed signal 39 (shown in FIG. 3). The encrypted video content 14 is fed into operating logic 62 for conversion to a reconstructed continuous signal 39. The operating logic ("operating logic") 62 includes four components: processor 63, frame buffer 64, memory 65 and removable memory 70 connected by bus 67. The memory 65 stores both operational program logic and transient data. The processor 63 executes instructions stored in the memory 65 to control the retrieval, decryption and transformation of the encrypted video content 14 from a videotape 69 into a reconstructed video signal 39. Individual encrypted frames 34 are retrieved from the videotape 69 via a read transport assembly 68 and read into the frame buffer 64. The removable memory 70 preferably includes a program 72 and a decryption key 73. The program 72 includes instructions for decrypting the encrypted frames 34 using the decryption key 73.

In the described embodiment, the removable memory 70 operatively couples to a standardized connector 71, thereby enabling multiple decryption keys 73 to be used in conjunction with the video player 61. The processor 63 executes the program 72 to decrypt the encrypted frames 34 into decrypted frames 37. The decrypted frames 37 are formed back into a reconstructed video signal 39 by the frame buffer 64 and output as a video signal on signal connector 74.

In a further embodiment, the program 72 includes instructions for verifying digitally signed frames 34 using the decryption key 73, as further described below with reference to FIG. 12. Digitally signed video content 14 is retrieved from the videotape 69. The processor 63 executes the program 72 to decrypt a cryptographic hash of the frames 34 using the decryption key 73. A hash of the unverified frames is generated and compared to the decrypted hash. Matching hashes verify the veracity of the data and the identity of the author.

Figure 6:
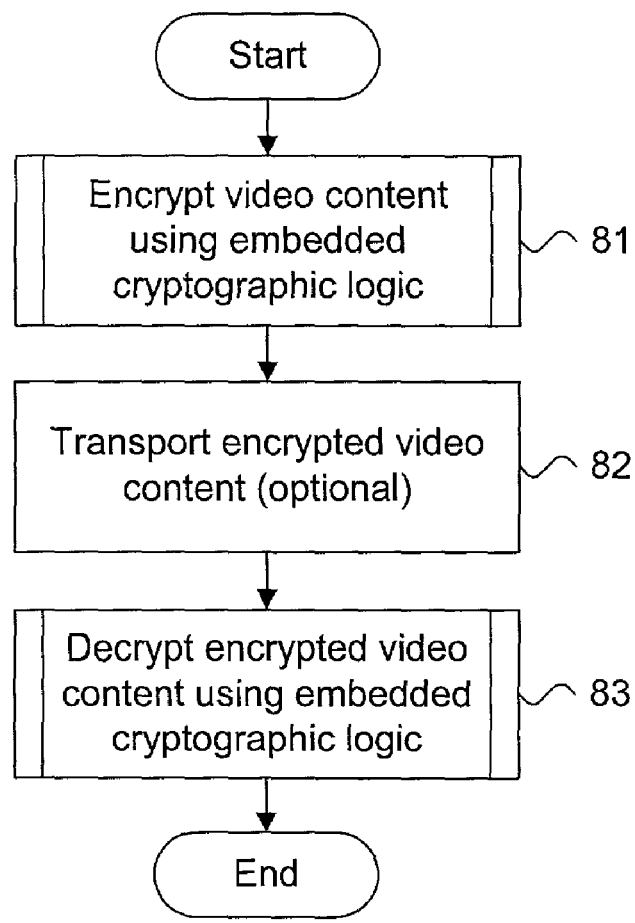
FIG. 6 is a flow diagram showing a method for automatically protecting video content using embedded cryptographic security, in accordance with the present invention.

FIG. 6 is a flow diagram showing a method 80 for automatically protecting video content using embedded cryptographic security, in accordance with the present invention. Raw video content 11 (shown in FIG. 1) is encrypted using embedded cryptographic operating logic 44 (shown in FIG. 4) (block 81), as further described below with reference to FIG. 7. The encrypted video content 14 is then optionally transported (block 82) from a recording device to a playback device, such as the video camera 12 and video player 15 of FIG. 1, respectively. Finally, the encrypted video content 14 is decrypted using embedded cryptographic operating logic 62 (shown in FIG. 5) (block 83), as further described below with reference to FIG. 8. The method then completes.

Figure 7:
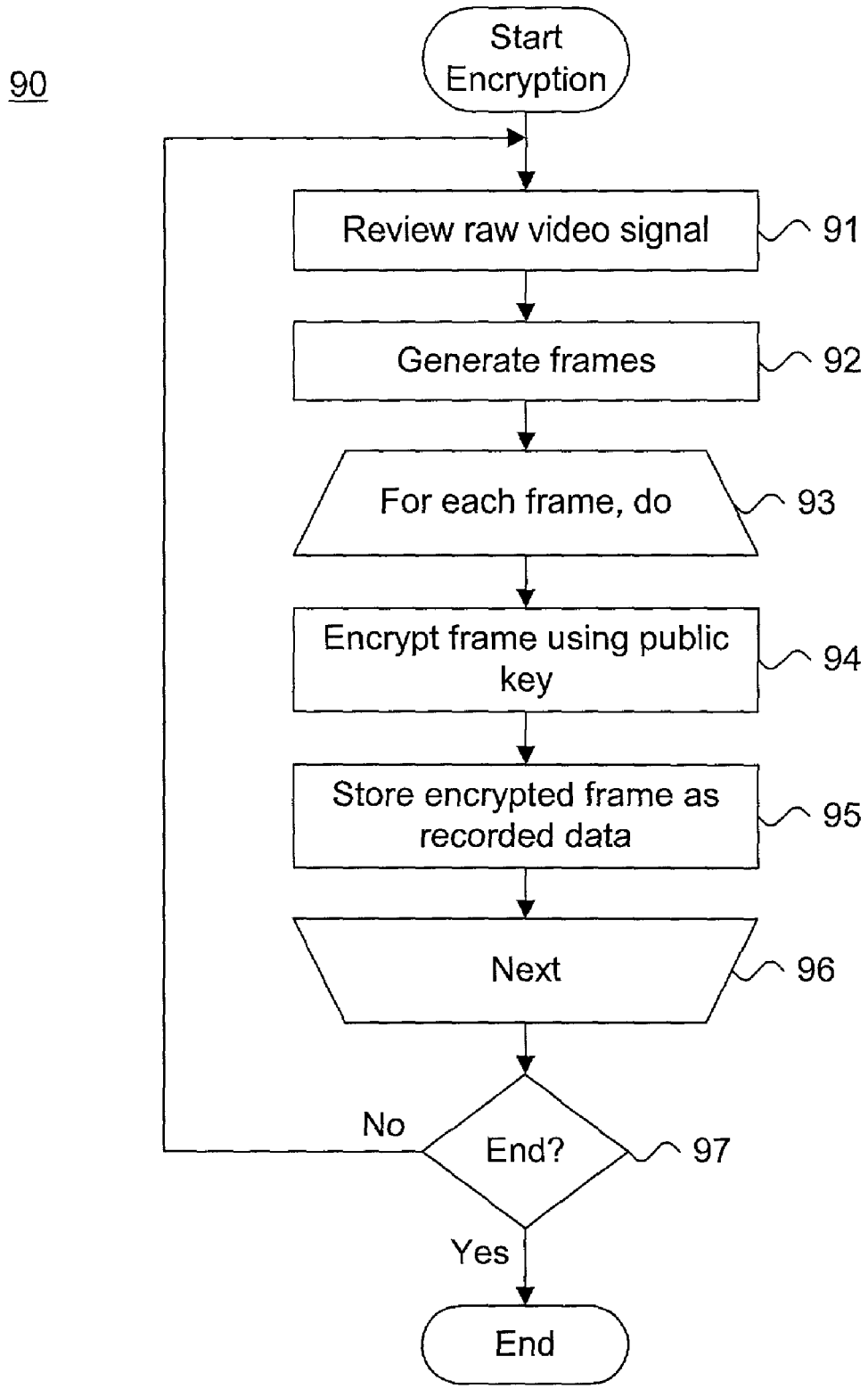
FIG. 7 is a flow diagram showing a routine for encrypting video content for use in the method of FIG. 6.

FIG. 7 is a flow diagram showing a routine 90 for encrypting video content for use in the method 80 of FIG. 6. A raw video signal 21 (shown in FIG. 2) is received (block 91) and individual frames 23 are generated (block 92) using a frame buffer 46 (shown in FIG. 4). For each of the frames 23, the following steps are performed (blocks 93–96). Each frame 23 is encrypted, preferably using a public key (block 94) to generate an encrypted frame 26. Each encrypted frame 26 is then stored as recorded data on a videotape 29 (block 95). The foregoing steps (blocks 94–95) are repeated for each of the frames 23 (blocks 93–96). This routine is repeated until the raw video signal 21 ends (block 97), after which the routine returns.

Figure 8:
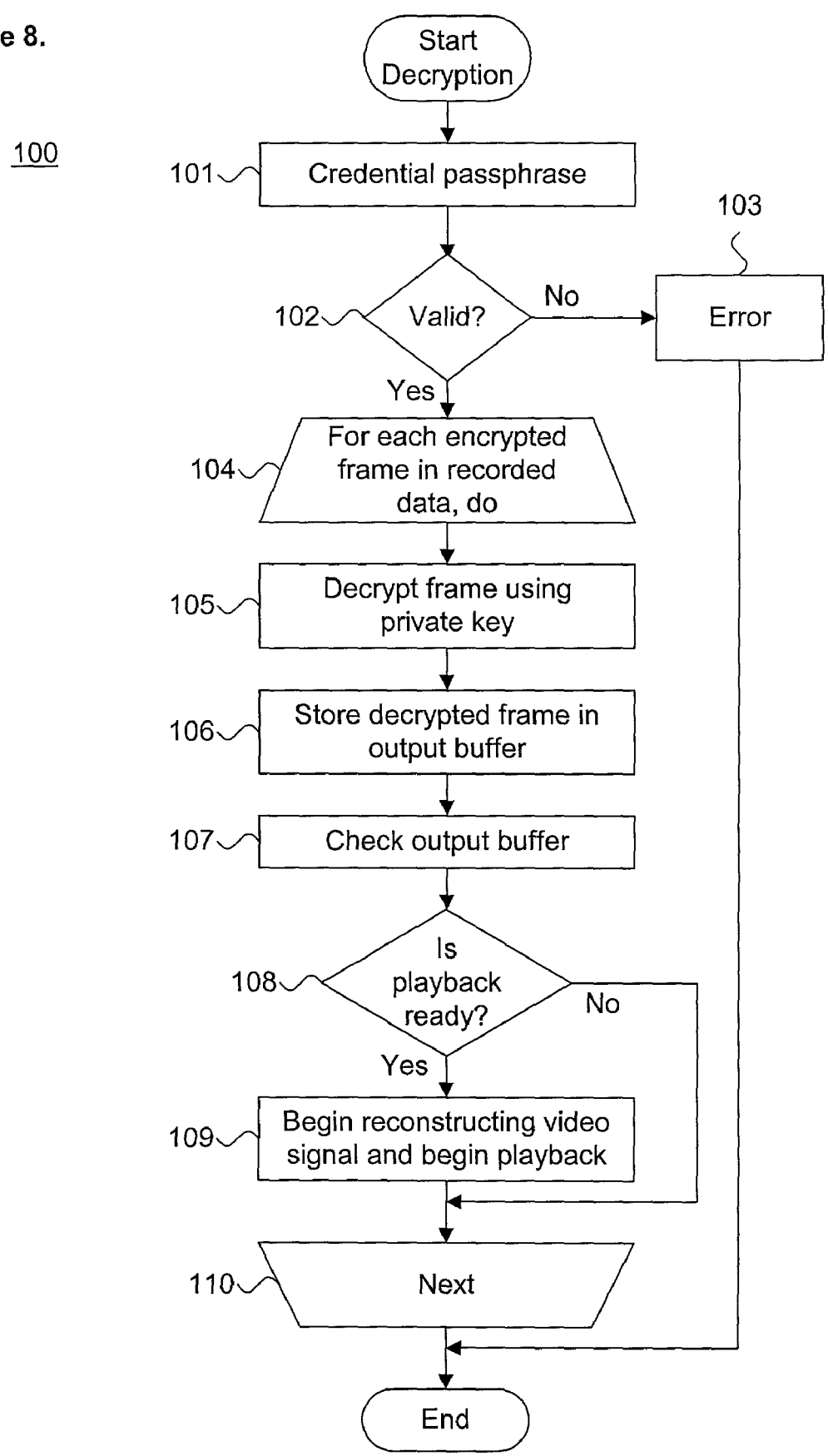
FIG. 8 is a flow diagram showing a routine for decrypting encrypted video content for use in the method of FIG. 6.

FIG. 8 is a flow diagram showing a routine 100 for decrypting encrypted video content 14 for use in the method 80 of FIG. 6. The decryption key is first credentialed using a pass-phrase or password (block 101) prior to decrypting the encrypted frames 34 (shown in FIG. 3). If the pass-phrase is not valid (block 102), an error condition is generated (block 103). If the cryptographic pass-phrase or password is valid (block 102), for each of the encrypted frames 34, the following steps are performed (blocks 104–110). Each encrypted frame 34 is decrypted, preferably using a private key (block 105). Each decrypted frame 37 is then stored in the output buffer for reconstruction as video (block 106). The output buffer is checked (block 107). If the video content is ready for playback (block 108), playback begins (block 109). When playback begins, the decrypted frames 34 stored in the output buffer are reconstructed into a video signal 39 (block 109). Otherwise, the process continues with the next encrypted frame 34 (block 110). The foregoing steps (blocks 105–109) are repeated for each of the encrypted frames 34 (blocks 104–110). The routine then returns.

Figure 9:
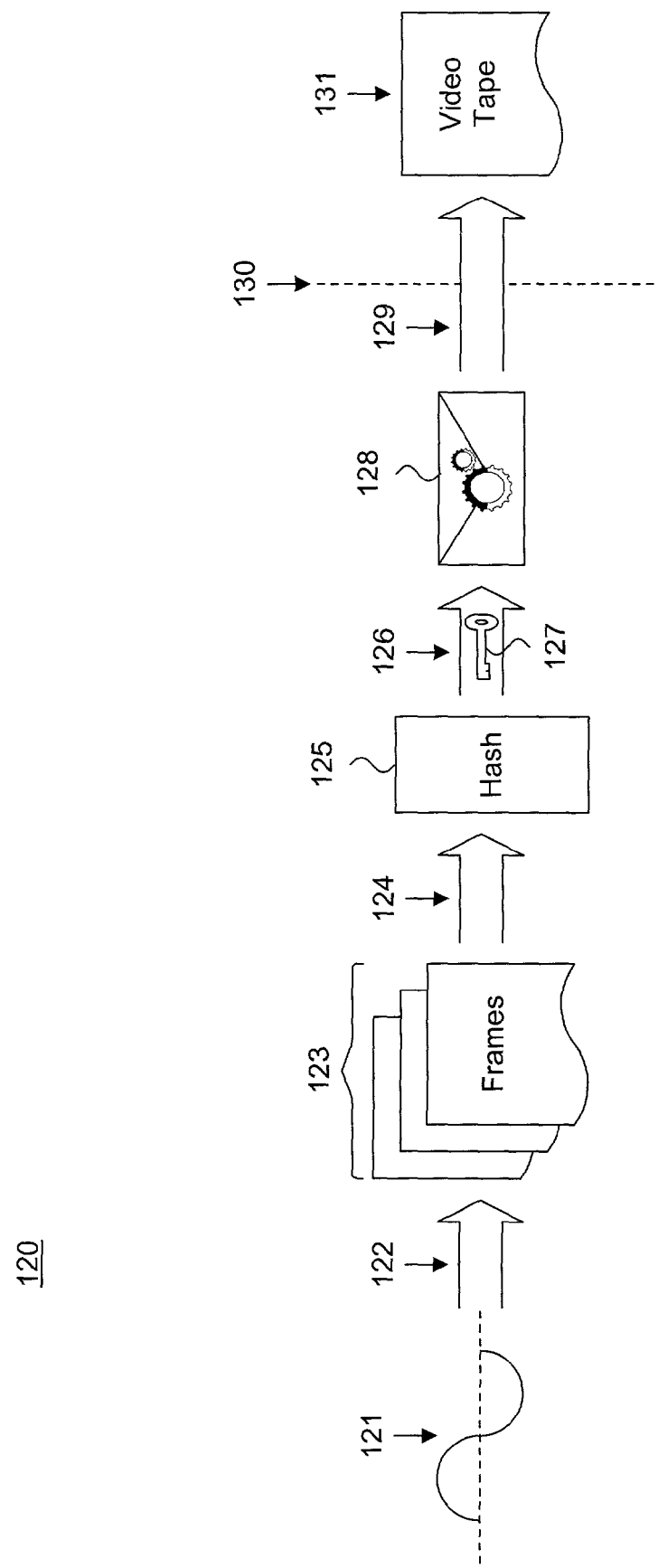
FIG. 9 is a process flow diagram showing the digital signing of the video content using the video camera of FIG. 1.

FIG. 9 is a process flow diagram showing the digital signing of the video content using the video camera of FIG. 1. The video content 11 is represented by a substantially continuous signal 121 that is generated by the video camera 12 as an electronic representation of the images and sounds being recorded. The continuous signal 121 is divided (transition 122) into discrete frames 123 of information having a fixed size. A cryptographic hash 125 is generated over each selected frame (transition 124) and the cryptographic hash 125 is encrypted using an encryption key 127, as further described below with reference to FIG. 12, to generate a digital signature 128. The frames (not shown) and digital signature 128 are then recorded (transition 129) onto a videotape 131. Note only signed video content passes the physical boundary 130 separating the video camera 12 (shown in FIG. 1) and the video tape 131.

Figure 10:
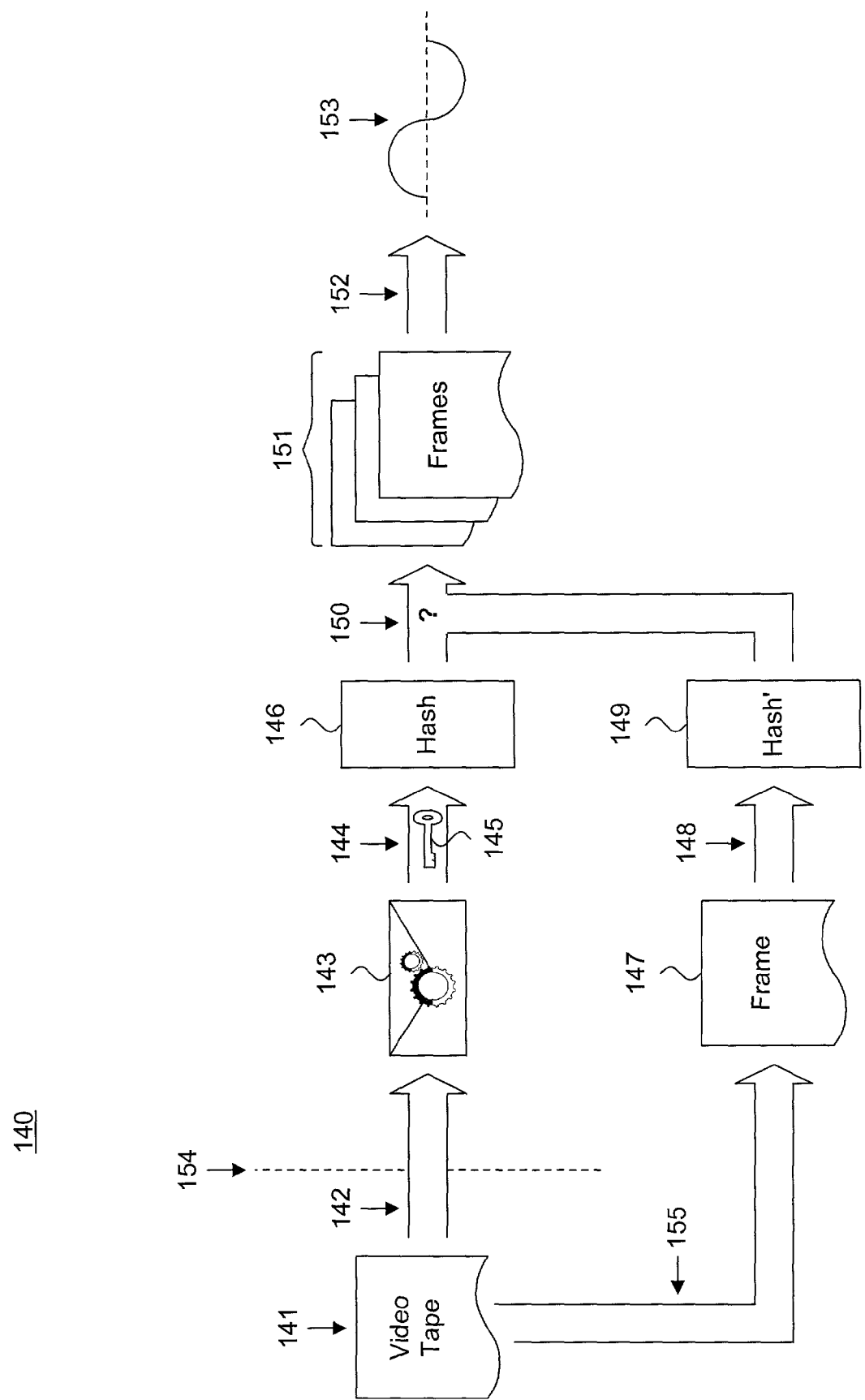
FIG. 10 is a process flow diagram showing the verification of digitally signed video content using the video player of FIG. 1.

FIG. 10 is a process flow diagram showing the verification of digitally signed video content using the video player of FIG. 1. A videotape 141 storing the digitally signed video content 14 is read and a digital signature 143 retrieved (transition 142) by the video player 15. The digital signature 143 is decrypted using a decryption key 145 and a cryptographic hash 146 is extracted (transition 144) from the decrypted digital signature 143, as further described below with reference to FIG. 13. A digitally-signed frame 147 is extracted (transition 155) from the video tape 141. A second cryptographic hash 149 is generated (transition 148) from the extracted frame 147. The cryptographic hashes are compared (transition 150) and, if matching, the frames 151 are reassembled (transition 152) into a reconstructed continuous signal 153 for viewing, processing or storage. Note only signed video content passes the physical boundary 154 separating the video tape 141 and the video player 15 (shown in FIG. 1).

Figure 11:
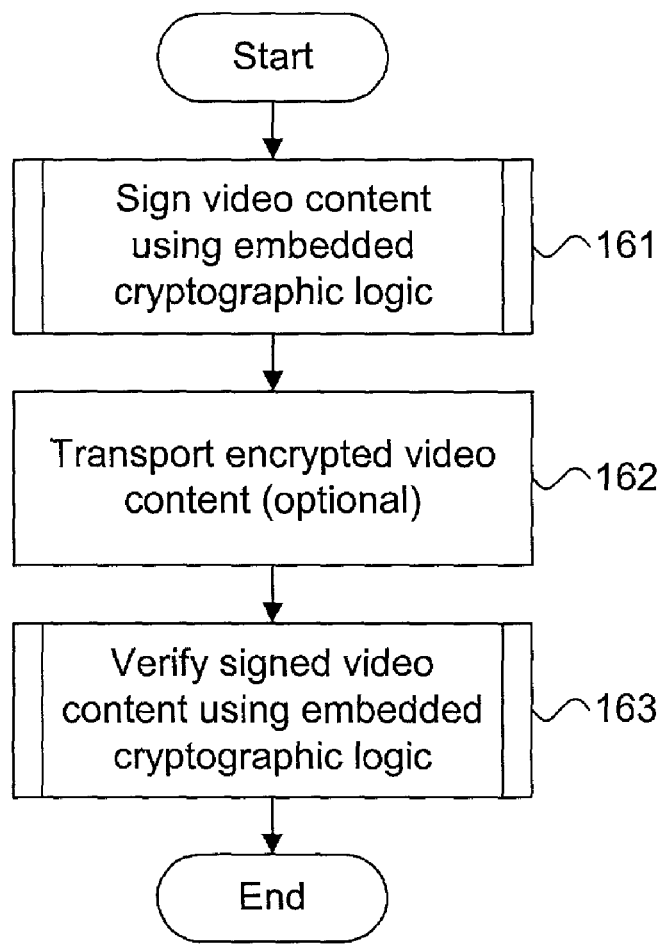
FIG. 11 is a flow diagram showing a method for automatically authenticating video content using embedded cryptographic security, in accordance with the present invention.

FIG. 11 is a flow diagram showing a method 160 for automatically authenticating video content using embedded cryptographic security, in accordance with the present invention. Raw video content 11 (shown in FIG. 1) is digitally signed using embedded cryptographic operating logic 44 (shown in FIG. 4) (block 161), as further described below with reference to FIG. 12. The digitally signed video content 14 is then optionally transported (block 162) from a recording device to a playback device, such as the video camera 12 video player 15 of FIG. 1. Finally, the digitally signed video content 14 is verified using embedded cryptographic operating logic 62 (shown in FIG. 5) (block 163), as further described below with reference to FIG. 13. The method then completes.

Figure 12:
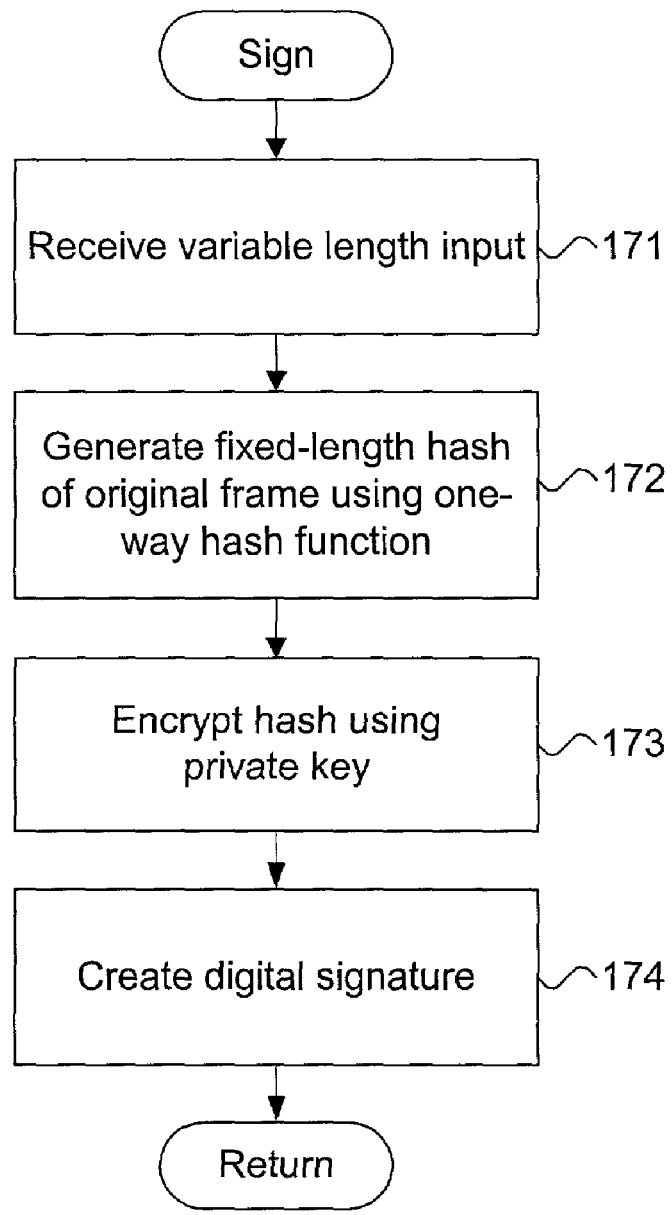
FIG. 12 is a flow diagram showing a routine for digitally signing video content for use in the method of FIG. 11.

FIG. 12 is a flow diagram showing a routine 170 for digitally signing video content for use in the method of FIG. 11. A frame having a variable length is received as input (block 171) using a frame buffer 46 (shown in FIG. 4). A fixed-length cryptographic hash 125 (shown in FIG. 9) is generated using a one-way hashing function (block 172), such as described "Introduction to Cryptography,", http://www.pgpi.org/doc/guide/6.5/en/intro/, Networks Associates Technology, Inc., Santa Clara, Calif. (2001), the disclosure of which is incorporated by reference. The cryptographic hash 125 is encrypted, preferably using a private key (block 173) and a digital signature 128 is created (block 174) using the encrypted cryptographic hash 125, after which the routine returns.

Figure 13:
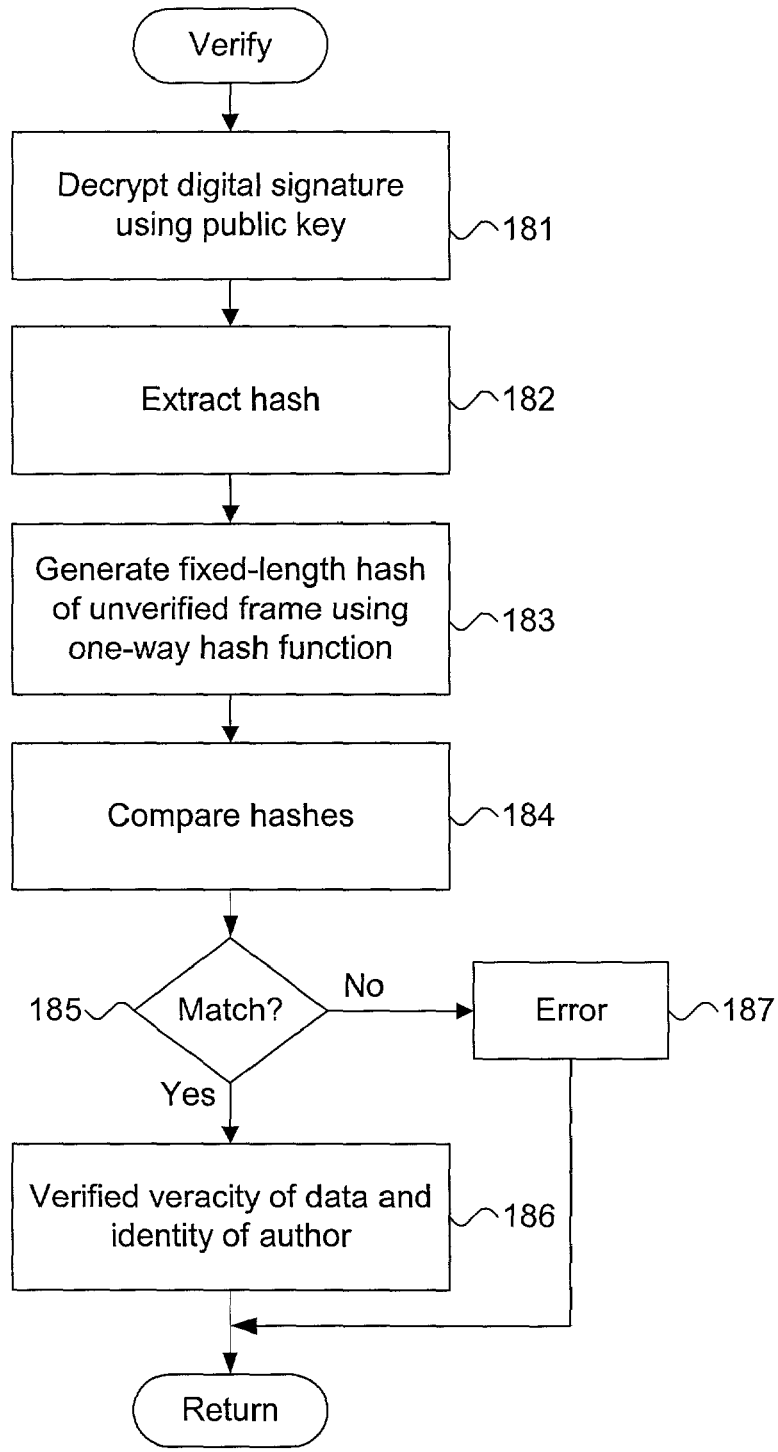
FIG. 13 is a flow diagram showing a routine for verifying digitally signed video content for use in the method of FIG. 11.

FIG. 13 is a flow diagram showing a routine 180 for verifying digitally signed video content for use in the method of FIG. 11. A digital signature 128 is retrieved from digitally signed video content and decrypted, preferably using a public key (block 181). A cryptographic hash is extracted from the decrypted digital signature (block 182). A second cryptographic hash is generated from the signed frame from the digitally signed video content using the same one-way hashing function used to generate the extracted cryptographic hash (block 183). The cryptographic hashes are compared (block 184) and, if both match (block 185), the veracity of the data and identity of the author are verified (block 186). Otherwise, an error is generated (block 187) indicating possible data compromise. The routine then returns.

Figure 14:
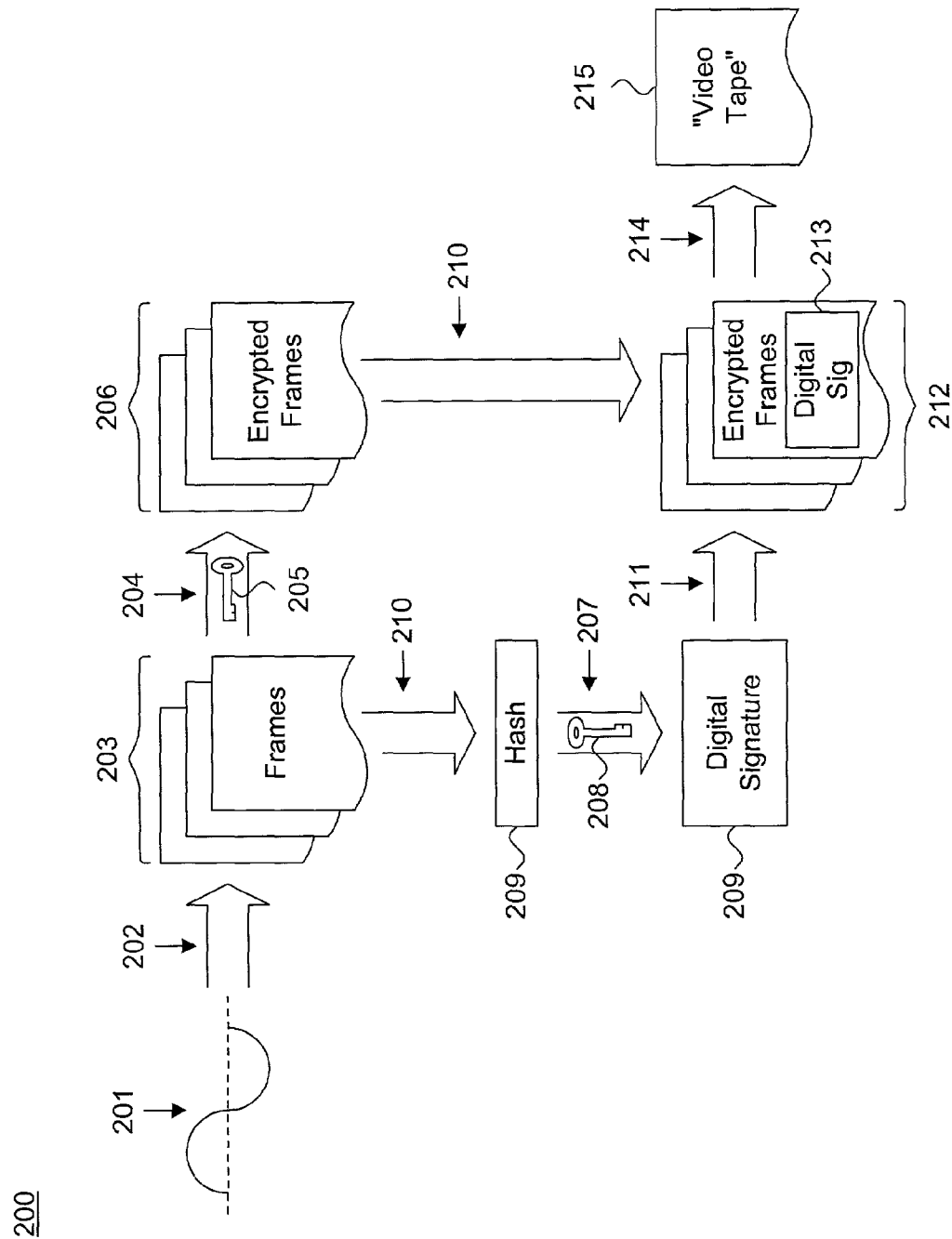
FIG. 14 is a process flow diagram showing the digital signing of encrypted video content using the video camera of FIG. 1, in accordance with a further embodiment.

FIG. 14 is a process flow diagram 200 showing the digital signing of encrypted video content using the video camera 12 of FIG. 1, in accordance with a further embodiment. The video content 11 is represented by a substantially continuous signal 201 that is converted into frames 203 having a fixed size (transition 202) by the video camera frame buffer 53. The frames are encrypted (transition 204) into encrypted frames 206 using a public cryptographic key 205. A cryptographic hash 209 is generated from selected frames 203 (transition 210). A one-way cryptographically strong hashing function is applied to each frame. The cryptographic hash is digitally signed (transition 207) to create a digital signature 209 using a private cryptographic key 208. The encrypted frames 212 and digital signature 213 are combined (transitions 210 and 211, respectively) and stored onto a "videotape" 215 (transition 214) as an electronic representation of the images and sounds being recorded.

In the described embodiment, each frame 203 is digitally signed on an individual basis. However, groups of combined frames can be signed for improved performance. For example, five frames could be signed as a single entity. Digital signatures can also be combined with encryption to optimize video content protection. Single or groups of encrypted frames can be digitally signed.

Figure 15:
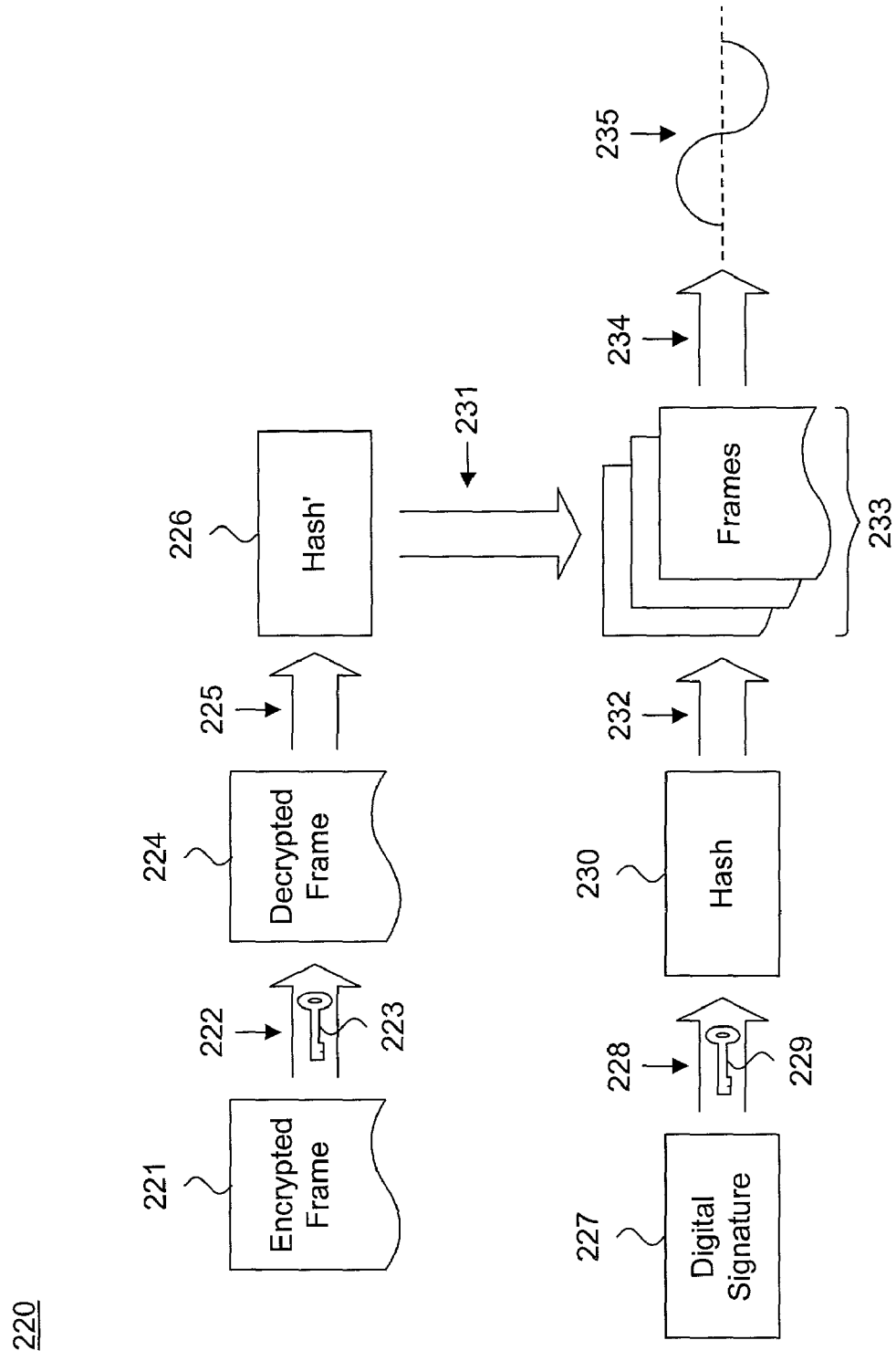
FIG. 15 is a process flow diagram showing the authentication of digital signed encrypted video content using the video player of FIG. 1, in accordance with a further embodiment.

FIG. 15 is a process flow diagram 220 showing the authentication of digital signed encrypted video content using the video player 16 of FIG. 1, in accordance with a further embodiment. Encrypted video content 13 is read from a crypto-embedded videotape 14 by the video player 16 (shown in FIG. 1). The encrypted video content 13 is retrieved as a sequence of encrypted frames (not shown) stored by the cryptographic operating logic in the crypto-embedded videotape 14 during the digital signature process 200 of FIG. 2. Each encrypted frame 221 is decrypted (transition 222) using a private cryptographic key 223 to create a decrypted frame 224. A cryptographic hash (Hash) 226 is generated from each decrypted frame 224 (transition 225). A one-way cryptographically strong hashing function is applied to each frame. As well, a digital signature 227 is authenticated (transition 228) using a public cryptographic key 229 to re-create the cryptographic hash 230 generated from the original framed video content. The two cryptographic hashes are compared and, provided the two cryptographic hashes are matching, combined into decrypted frames 233 (transitions 231 and 232). The decrypted frames 34 are reassembled (transition 234) into a "videotape" 37 for viewing, processing or storage as a continuous signal 235.

While the invention has been particularly shown and described as referenced to the embodiments thereof, those skilled in the art will understand that the foregoing and other changes in form and detail may be made therein without departing from the spirit and scope of the invention.

What is claimed is:

1. A system for automatically protecting private video content using embedded cryptographic security, comprising:
   a recorder frame buffer dividing a substantially continuous video signal representing raw video content into individual frames which each store a fixed amount of data in digital form;
   an encryption module encrypting each individual frame into encrypted video content using an encryption cryptographic key and storing the encrypted frames on a transportable storage medium;
   a decryption module retrieving encrypted frames from the transportable storage medium and decrypting each encrypted frame into decrypted frames using a decryption cryptographic key that is verified prior to decryption;
   a playback frame buffer combining the decrypted frames into a substantially continuous video signal representing the raw video content in reconstructed form;

a signature module generating a fixed-length original cryptographic hash from at least one such individual frame, encrypting the original cryptographic hash using an encryption cryptographic key, and storing the encrypted original cryptographic hash as a digital signature on the transportable storage medium;

a verification module retrieving the digital signature from the transportable storage medium, decrypting the encrypted original cryptographic hash using a decryption cryptographic key, generating a verification fixed-length cryptographic hash from at least one such corresponding decrypted frame, and comparing the verification cryptographic hash and the original cryptographic hash;

a validation module validating the decryption cryptographic key against user-provided credentials prior to decrypting the encrypted frames;

a set of cryptographic instructions employing at least one of the encryption cryptographic key and the decryption cryptographic key; and a removable storage medium storing at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;

wherein only encrypted and signed video content passes a first physical boundary separating the recorder from the transportable storage medium;

wherein only the encrypted and signed video content passes a second physical boundary separating the transportable storage medium from the player.

2. A system according to claim 1, further comprising:

an asymmetric cryptographic key pair comprising a private key corresponding to the encryption cryptographic key and a public key corresponding to the decryption cryptographic key.

3. A system according to claim 1, further comprising:

an asymmetric cryptographic key pair comprising a public key corresponding to the encryption cryptographic key and a private key corresponding to the decryption cryptographic key.

4. A system according to claim 3, wherein the asymmetric cryptographic key pair comprises at least one of an RSA-compatible key pair, a TwoFish-compatible key pair and a Diffie-Hellman-compatible key pair.

5. A system according to claim 1, further comprising:

a symmetric cryptographic key pair comprising a substantially identical key corresponding to each of the encryption cryptographic key and the decryption cryptographic key.

6. A method for automatically protecting private video content using embedded cryptographic security, comprising:

dividing a substantially continuous video signal representing raw video content into individual frames which each store a fixed amount of data in digital form;

encrypting each individual frame into encrypted video content using an encryption cryptographic key and storing the encrypted frames on a transportable storage medium;

retrieving encrypted frames from the transportable storage medium and decrypting each encrypted frame into decrypted frames using a decryption cryptographic key that is verified prior to decryption;

combining the decrypted frames into a substantially continuous video signal representing the raw video content in reconstructed form;

generating a fixed-length original cryptographic hash from at least one such individual frame;

encrypting the original cryptographic hash using an encryption cryptographic key and storing the encrypted original cryptographic hash as a digital signature on the transportable storage medium;

retrieving the digital signature from the transportable storage medium and decrypting the encrypted original cryptographic hash using a decryption cryptographic key;

generating a verification fixed-length cryptographic hash from at least one such corresponding decrypted frame and comparing the verification cryptographic hash and the original cryptographic hash;

validating the decryption cryptographic key against user-provided credentials prior to decrypting the encrypted frames;

including a set of cryptographic instructions employing at least one of the encryption cryptographic key and the decryption cryptographic key; and storing on a removable storage medium at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;

wherein only encrypted and signed video content passes a first physical boundary separating the recorder from the transportable storage medium;

wherein only the encrypted and signed video content passes a second physical boundary separating the transportable storage medium from the player.

7. A method according to claim 6, further comprising:

providing an asymmetric cryptographic key pair comprising a private key corresponding to the encryption cryptographic key and a public key corresponding to the decryption cryptographic key.

8. A method according to claim 6, further comprising:

providing an asymmetric cryptographic key pair comprising a public key corresponding to the encryption cryptographic key and a private key corresponding to the decryption cryptographic key.

9. A method according to claim 8, wherein the asymmetric cryptographic key pair comprises at least one of an RSA-compatible key pair, a TwoFish-compatible key pair and a Diffie-Hellman-compatible key pair.

10. A method according to claim 6, further comprising:
providing a symmetric cryptographic key pair comprising a substantially identical key corresponding to each of the encryption cryptographic key and the decryption cryptographic key.

11. A computer-readable storage medium holding code for performing the method according to claims 6, 7, 8, 9, or 10.

12. A system for encrypting private video content using embedded cryptographic security, comprising:
a frame buffer receiving a substantially continuous video signal representing raw video content and dividing the data signal into individual frames which each store a fixed amount of data in digital form;
a processor encrypting each individual frame into encrypted video content using an encryption cryptographic key selected from a cryptographic key pair; and
a recorder storing the encrypted frames on a transportable storage medium for retrieval and decryption using a decryption cryptographic key selected from the cryptographic key pair,
wherein the processor generates a fixed-length original cryptographic hash from at least one such individual frame and encrypts the original cryptographic hash using an encryption cryptographic key selected from the cryptographic key pair and the recorder stores the encrypted original cryptographic hash as a digital signature on the transportable storage medium for retrieval and verification using a decryption cryptographic key selected from the cryptographic key pair,
wherein the decryption cryptographic key is validated against user-provided credentials prior to decrypting the encrypted frames;
wherein a set of cryptographic instructions employs at least one of the encryption cryptographic key and the decryption cryptographic key;
wherein a removable storage medium stores at least one of the encryption cryptographic key or the decryption cryptographic key such that a plurality of encryption or decryption cryptographic keys, associated with the removable storage medium, are capable of being utilized for encrypting or decrypting the individual frames, where the removable storage medium comprises only memory that stores the set of cryptographic instructions and the plurality of the encryption or decryption cryptographic keys, and is separate from a player which is capable of playing the video content on the transportable storage medium or the recorder which is capable of recording the video content on the transportable storage medium;
wherein only encrypted and signed video content passes a first physical boundary separating the recorder from the transportable storage medium;
wherein only the encrypted and signed video content passes a second physical boundary separating the transportable storage medium from the player.

13. A system according to claim 12, further comprising:
a private key corresponding to the encryption cryptographic key and a public key corresponding to the decryption cryptographic key.

14. A system according to claim 12, further comprising:
a public key corresponding to the encryption cryptographic key and a private key corresponding to the decryption cryptographic key.

15. A system according to claim 12, further comprising:
a substantially identical key corresponding to each of the encryption cryptographic key and the decryption cryptographic key.

16. A method for encrypting private video content using embedded cryptographic security, comprising:
receiving a substantially continuous video signal representing raw video content and dividing the data signal into individual frames which each store a fixed amount of data in digital form;
encrypting each individual frame into encrypted video content using an encryption cryptographic key selected from a cryptographic key pair;
storing the encrypted frames on a transportable storage medium for retrieval and decryption using a decryption cryptographic key selected from the cryptographic key pair;
generating a fixed-length original cryptographic hash from at least one such individual frame;
encrypting the original cryptographic hash using an encryption cryptographic key selected from the cryptographic key pair;
storing the encrypted original cryptographic hash as a digital signature on the transportable storage medium for retrieval and verification using a decryption cryptographic key selected from the cryptographic key pair;
validating the decryption cryptographic key against user-provided credentials prior to decrypting the encrypted frames;
including a set of cryptographic instructions employing at least one of the encryption cryptographic key and the decryption cryptographic key; and
storing in a removable storage medium at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;
wherein only encrypted and signed video content passes a first physical boundary separating the recorder from the transportable storage medium;
wherein only the encrypted and signed video content passes a second physical boundary separating the transportable storage medium from the player.

17. A method according to claim 16, further comprising:
employing a private key corresponding to the encryption cryptographic key and a public key corresponding to the decryption cryptographic key.

18. A method according to claim 16, further comprising:
employing a public key corresponding to the encryption cryptographic key and a private key corresponding to the decryption cryptographic key.

19. A method according to claim 16, further comprising:
employing a substantially identical key corresponding to each of the encryption cryptographic key and the decryption cryptographic key.

20. A computer-readable storage medium holding code for performing the method according to claims 16, 17, 18, or 19.

21. A system for decrypting private video content using embedded cryptographic security, comprising:
a player retrieving encrypted frames from a transportable storage medium, the encrypted frames storing raw video content encrypted using an encryption cryptographic key selected from a cryptographic key pair;
a processor decrypting each encrypted frame using a decryption cryptographic key selected from the cryptographic key pair; and
a frame buffer combining the decrypted frames into a substantially continuous video signal representing the raw video content in reconstructed form,
wherein the player retrieves a digital signature from the transportable storage medium, the digital signature containing an original cryptographic hash encrypted using an encryption cryptographic key selected from the cryptographic key pair, and the processor decrypts the encrypted original cryptographic hash using a decryption cryptographic key selected from the cryptographic key pair, generates a verification fixed-length cryptographic hash from at least one individual frame retrieved from the transportable storage medium, and compares the verification cryptographic hash and the original cryptographic hash;
wherein the decryption cryptographic key is validated against user-provided credentials prior to decrypting the encrypted frames;
wherein a set of cryptographic instructions employs at least one of the encryption cryptographic key and the decryption cryptographic key;
wherein a removable storage medium stores at least one of the encryption cryptographic key or the decryption cryptographic key such that a plurality of encryption or decryption cryptographic keys, associated with the removable storage medium, are capable of being utilized for encrypting or decrypting the individual frames, where the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;
wherein only encrypted and signed video content passes a first physical boundary separating the recorder from the transportable storage medium;
wherein only the encrypted and signed video content passes a second physical boundary separating the transportable storage medium from the player.

22. A system according to claim 21, further comprising:
a public key corresponding to the encryption cryptographic key and a private key corresponding to the decryption cryptographic key.

23. A system according to claim 21, further comprising:
a public key corresponding to the encryption cryptographic key and a private key corresponding to the decryption cryptographic key.

24. A system according to claim 21, further comprising:
a substantially identical key corresponding to each of the encryption cryptographic key and the decryption cryptographic key.

25. A method for decrypting private video content using embedded cryptographic security, comprising:
retrieving encrypted frames from a transportable storage medium, the encrypted frames storing raw video content encrypted using an encryption cryptographic key selected from a cryptographic key pair;
decrypting each encrypted frame using a decryption cryptographic key selected from the cryptographic key pair;
combining the decrypted frames into a substantially continuous video signal representing the raw video content in reconstructed form;
retrieving a digital signature from the transportable storage medium, the digital signature containing an original cryptographic hash encrypted using an encryption cryptographic key selected from the cryptographic key pair;
decrypting the encrypted original cryptographic hash using a decryption cryptographic key selected from the cryptographic key pair;
generating a verification fixed-length cryptographic hash from at least one individual frame retrieved from the transportable storage medium and comparing the verification cryptographic hash and the original cryptographic hash;
validating the decryption cryptographic key against user-provided credentials prior to decrypting the encrypted frames;
including a set of cryptographic instructions employing at least one of the encryption cryptographic key and the decryption cryptographic key; and
storing on a removable storage medium at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;
wherein only encrypted and signed video content passes a first physical boundary separating the recorder from the transportable storage medium;
wherein only encrypted and signed video content passes a second physical boundary separating the transportable storage medium from the player.

26. A method according to claim 25, further comprising:
employing a public key corresponding to the encryption cryptographic key and a private key corresponding to the decryption cryptographic key.

27. A method according to claim 25, further comprising:
employing a substantially identical key corresponding to each of the encryption cryptographic key and the decryption cryptographic key.

28. A computer-readable storage medium holding code for performing the method according to claims 25 or 26.

29. A system for automatically authenticating private video content using embedded cryptographic security, comprising:
a recorder frame buffer dividing a substantially continuous video signal representing raw video content into individual frames which each store a fixed amount of data in digital form;
a signature module generating a fixed-length original cryptographic hash from at least one such individual frame, encrypting the original cryptographic hash using an encryption cryptographic key comprising a private key of an asymmetric cryptographic pair, and storing the encrypted original cryptographic hash as a digital signature on a transportable storage medium;

a verification module retrieving the digital signature from the transportable storage medium and decrypting the encrypted original cryptographic hash using a decryption cryptographic key comprising a public key of an asymmetric cryptographic pair;

a player frame buffer generating a verification fixed-length cryptographic hash from at least one such individual frame and comparing the verification cryptographic hash and the original cryptographic hash;

a validation module validating the decryption cryptographic key against user-provided credentials prior to decrypting the encrypted frames;

a set of cryptographic instructions employing at least one of the encryption cryptographic key and the decryption cryptographic key; and a removable storage medium storing at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;

wherein only encrypted and signed video content passes a first physical boundary separating the recorder from the transportable storage medium;

wherein only the encrypted and signed video content passes a second physical boundary separating the transportable storage medium from the player.

30. A system according to claim 29, wherein the asymmetric cryptographic key pair comprises at least one of an RSA-compatible key pair, a TwoFish-compatible key pair and a Diffie-Hellman-compatible key pair.

31. A method for automatically authenticating private video content using embedded cryptographic security, comprising:

dividing a substantially continuous video signal representing raw video content into individual frames which each store a fixed amount of data in digital form and generating a fixed-length original cryptographic hash from at least one such individual frame;

encrypting the original cryptographic hash using an encryption cryptographic key comprising a private key of an asymmetric pair and storing the encrypted original cryptographic hash as a digital signature on a transportable storage medium;

retrieving the digital signature from the transportable storage medium and decrypting the encrypted original cryptographic hash using a decryption cryptographic key comprising a public key of an asymmetric cryptographic pair;

generating a verification fixed-length cryptographic hash from at least one such individual frame and comparing the verification cryptographic hash and the original cryptographic hash;

validating the decryption cryptographic key against user-provided credentials prior to decrypting the encrypted frames;

including a set of cryptographic instructions employing at least one of the encryption cryptographic key and the decryption cryptographic key; and storing on a removable storage medium at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;

wherein only encrypted and signed video content passes a first physical boundary separating the recorder from the transportable storage medium;

wherein only the encrypted and signed video content passes a second physical boundary separating the transportable storage medium from the player.

32. A method according to claim 31, wherein the asymmetric cryptographic key pair comprises at least one of an RSA-compatible key pair, a TwoFish-compatible key pair and a Diffie-Hellman-compatible key pair.

33. A computer-readable storage medium holding code for performing the method according to claim 31.

34. A system for digitally signing private video content using embedded cryptographic security, comprising:

a frame buffer receiving a substantially continuous video signal representing raw video content and dividing the data signal into individual frames which each store a fixed amount of data in digital form;

a processor generating a fixed-length original cryptographic hash from at least one such individual frame and encrypting the original cryptographic hash using an encryption cryptographic key selected from a cryptographic key pair; and a recorder storing the encrypted original cryptographic hash as a digital signature on a transportable storage medium for retrieval and verification using a decryption cryptographic key selected from the cryptographic key pair;

wherein the decryption cryptographic key is validated against user-provided credentials prior to decrypting the encrypted frames;

wherein a set of cryptographic instructions employs at least one of the encryption cryptographic key and the decryption cryptographic key;

wherein a removable storage medium stores at least one of the encryption cryptographic key or the decryption cryptographic key such that a plurality of encryption or decryption cryptographic keys, associated with the removable storage medium, are capable of being utilized for encrypting or decrypting the individual frames, where the removable storage medium comprises only memory that stores the set of cryptographic instructions and the plurality of the encryption or decryption cryptographic keys, and is separate from a player which is capable of playing the video content on the transportable storage medium or the recorder which is capable of recording the video content on the transportable storage medium;

wherein only encrypted and signed video content passes a first physical boundary separating the recorder from the transportable storage medium;

wherein only the encrypted and signed video content passes a second physical boundary separating the transportable storage medium from the player.

35. A system according to claim 34, further comprising:
a private key corresponding to the encryption cryptographic key and a public key corresponding to the decryption cryptographic key.

36. A method for digitally signing private video content using embedded cryptographic security, comprising:
receiving a substantially continuous video signal representing raw video content and dividing the data signal into individual frames which each store a fixed amount of data in digital form;
generating a fixed-length original cryptographic hash from at least one such individual frame;
encrypting the original cryptographic hash using an encryption cryptographic key selected from a cryptographic key pair;
storing the encrypted original cryptographic hash as a digital signature on a transportable storage medium for retrieval and verification using a decryption cryptographic key selected from the cryptographic key pair;
validating the decryption cryptographic key against user-provided credentials prior to decrypting the encrypted frames;
including a set of cryptographic instructions employing at least one of the encryption cryptographic key and the decryption cryptographic key; and
storing on a removable storage medium at least one of the encryption cryptographic key or the decryption cryptographic key such that a plurality of encryption or decryption cryptographic keys, associated with the removable storage medium, are capable of being utilized for encrypting or decrypting the individual frames, wherein the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;
wherein only encrypted and signed video content passes a first physical boundary separating the recorder from the transportable storage medium;
wherein only the encrypted and signed video content passes a second physical boundary separating the transportable storage medium from the player.

37. A method according to claim 36, further comprising:
employing a private key corresponding to the encryption cryptographic key and a public key corresponding to the decryption cryptographic key.

38. A computer-readable storage medium holding code for performing the method according to claims 36 or 37.

39. A system for verifying digitally signed private video content using embedded cryptographic security, comprising:
a player retrieving a digital signature from a transportable storage medium, the digital signature containing an original cryptographic hash encrypted using an encryption cryptographic key selected from a cryptographic key pair; and
a processor decrypting the encrypted original cryptographic hash using a decryption cryptographic key selected from the cryptographic key pair, generating a verification fixed-length cryptographic hash from at least one individual frame retrieved from the transportable storage medium, and comparing the verification cryptographic hash and the original cryptographic hash;
wherein the decryption cryptographic key is validated against user-provided credentials prior to decrypting the encrypted frames;
wherein a set of cryptographic instructions employs at least one of the encryption cryptographic key and the decryption cryptographic key;
wherein a removable storage medium stores at least one of the encryption cryptographic key or the decryption cryptographic key such that a plurality of encryption or decryption cryptographic keys, associated with the removable storage medium, are capable of being utilized for encrypting or decrypting the individual frames, where the removable storage medium comprises only memory that stores the set of cryptographic instructions and the plurality of the encryption or decryption cryptographic keys, and is separate from the player which is capable of playing the video content on the transportable storage medium or a recorder which is capable of recording the video content on the transportable storage medium;
wherein only encrypted and signed video content passes a first physical boundary separating the recorder from the transportable storage medium;
wherein only the encrypted and signed video content passes a second physical boundary separating the transportable storage medium from the player.

40. A system according to claim 39, further comprising:
a public key corresponding to the encryption cryptographic key and a private key corresponding to the decryption cryptographic key.

41. A method for verifying digitally signed private video content using embedded cryptographic security, comprising:
retrieving a digital signature from a transportable storage medium, the digital signature containing an original cryptographic hash encrypted using an encryption cryptographic key selected from a cryptographic key pair;
decrypting the encrypted original cryptographic hash using a decryption cryptographic key selected from the cryptographic key pair;
generating a verification fixed-length cryptographic hash from at least one individual frame retrieved from the transportable storage medium and comparing the verification cryptographic hash and the original cryptographic hash;
validating the decryption cryptographic key against user-provided credentials prior to decrypting the encrypted frames; and
including a set of cryptographic instructions employing at least one of the encryption cryptographic key and the decryption cryptographic key;
wherein a removable storage medium stores at least one of the encryption cryptographic key or the decryption cryptographic key such that a plurality of encryption or decryption cryptographic keys, associated with the removable storage medium, are capable of being utilized for encrypting or decrypting the individual frames, where the removable storage medium comprises only memory that stores the set of cryptographic instructions and the plurality of the encryption or decryption cryptographic keys, and is separate from a player which is capable of playing the video content on the transportable storage medium or a recorder which is capable of recording the video content on the transportable storage medium;

wherein only encrypted and signed video content passes a first physical boundary separating the recorder from the transportable storage medium;

wherein only the encrypted and signed video content passes a second physical boundary separating the transportable storage medium from the player.

42. A computer-readable storage medium holding code for performing the method according to claim 41.

* * * * *

UNITED STATES PATENT AND TRADEMARK OFFICE
CERTIFICATE OF CORRECTION

PATENT NO. : 7,136,487 B1
APPLICATION NO. : 09/931803
DATED : November 14, 2006
INVENTOR(S) : Schon et al.

It is certified that error appears in the above-identified patent and that said Letters Patent is hereby corrected as shown below:

col. 12, line 39 replace "stores" with --stored--;
col. 13, line 36 replace "stores" with --stored--;
col. 14, line 29 replace "in" with --on--;
col. 14, line 36 replace "stores" with --stored--;
col. 15, line 27 replace "stores" with --stored--;
col. 16, line 23 replace "medium" with --medium;--;
col. 16, line 37 insert --the-- before "encrypted" and after "only";
col. 18, line 1 replace "medium" with --medium;--;
col. 19, line 29 replace "medium" with --medium;--.

Signed and Sealed this

Second Day of February, 2010

David J. Kappos
*Director of the United States Patent and Trademark Office*